United States Patent [19]

Bodart et al.

[11] 4,247,935
[45] Jan. 27, 1981

[54] ARRANGEMENT FOR CONVERTING START-STOP SIGNALS INTO AN ISOCHRONOUS SIGNAL

[75] Inventors: Robert Bodart; Jean P. A. R. J. Werts, both of Brussels, Belgium

[73] Assignee: U.S. Philips Corporation, New York, N.Y.

[21] Appl. No.: 47,183

[22] Filed: Jun. 8, 1979

[30] Foreign Application Priority Data

Jun. 16, 1978 [NL] Netherlands .................. 7806505

[51] Int. Cl.³ .......................................... H04L 5/00
[52] U.S. Cl. ...................................... 370/43; 375/117
[58] Field of Search ................ 178/50, 69.1, 53.1 R, 178/53, 68, 26 R, 26 A; 179/15 BA, 15 BS; 375/106, 110, 112, 113, 114, 116, 117; 370/47, 48, 49, 41, 43

[56] References Cited

U.S. PATENT DOCUMENTS

| 4,006,302 | 2/1977 | Reisinger | 179/15 BS |
| 4,032,709 | 6/1977 | Reisinger et al. | 178/50 |

*Primary Examiner*—Thomas A. Robinson
*Attorney, Agent, or Firm*—Thomas A. Briody; William J. Streeter; Edward W. Goodman

[57] ABSTRACT

An arrangement is described wherein the leading edge of an A-pulse in a telex signal is additionally delayed relative to the trailing edge, in order to prevent a specified upper limit from being exceeded at the conversion into an isochronous signal. For Z-pulses, a high upper limit for the number of bits is prescribed which, in cascade connections, may lead to degradation of the Z-pulses. The arrangement further enables, because of an additional delay of the leading edge of the Z-pulse relative to the trailing edge, the maximum number of bits in the isochronous signal to be one less than the maximum permissible number.

2 Claims, 2 Drawing Figures

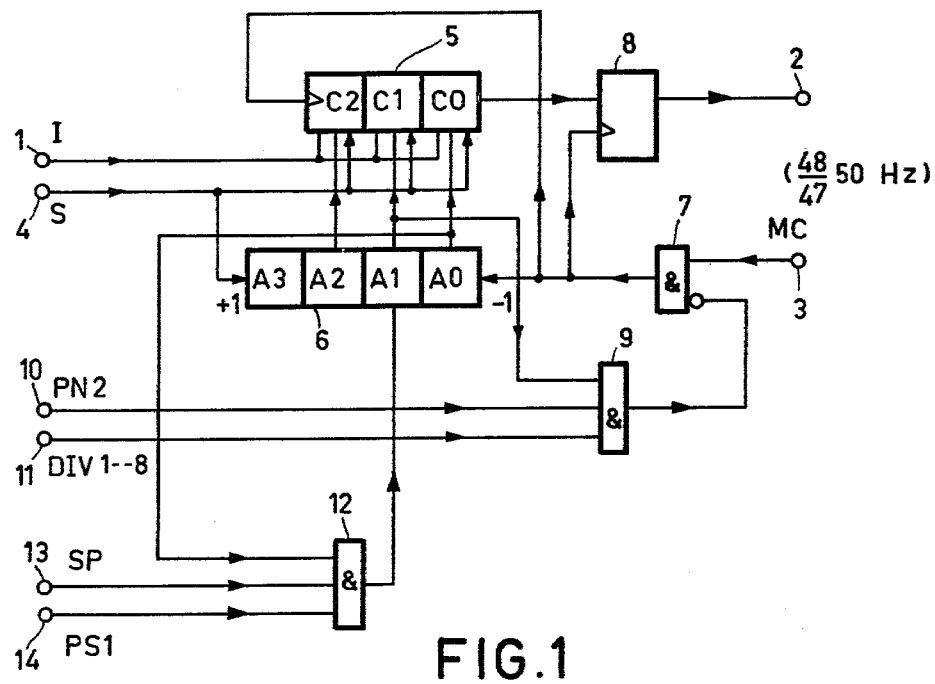
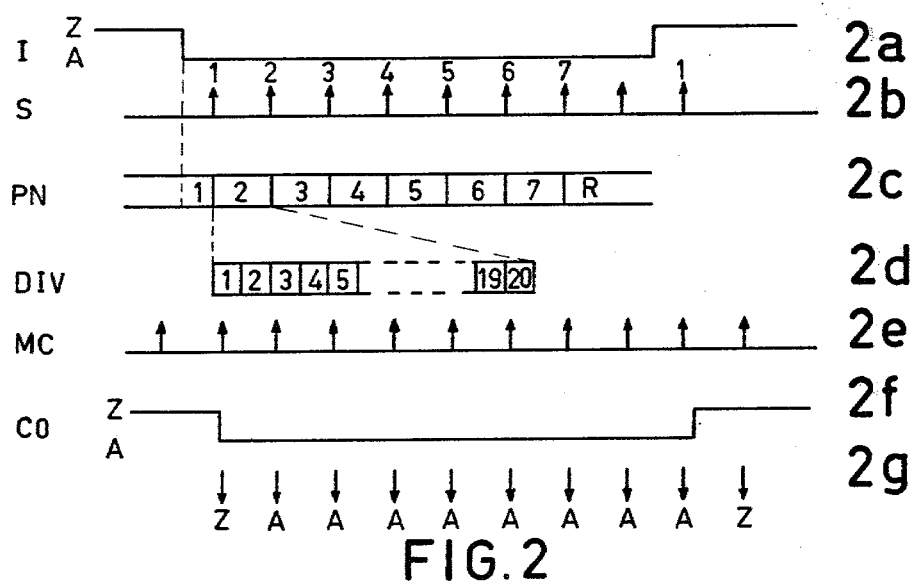

ARRANGEMENT FOR CONVERTING START-STOP SIGNALS INTO AN ISOCHRONOUS SIGNAL

A. BACKGROUND OF THE INVENTION

A(1). Field of the Invention

The invention relates to an arrangement for converting start-stop signals into an isochronous signal, comprising an elastic store wherein the sampling values obtained by sampling the start-stop signal at sampling moments, which have a given position with respect to given signal transitions, are stored in the elastic store and wherein the sampling values are read consecutively from the elastic store at isochronous instants for forming the isochronous signal.

The invention stems from the field of time-division multiplexing of telex signals in accordance with CCITT-recommendation R101.

In these multiplex telegraphy systems each telex signal is converted into an isochronous bit stream having one bit per signal element and the isochronous bit streams are interleaved bit-wise to an aggregate signal having a bit rate of 2400 bit/sec.

A(2). Description of the Prior Art

U.K. Pat. No. 1,065,866 discloses a system for converting a start-stop signal into an isochronous signal.

This system comprises a shift register having two register stages. Samples of the telegraph signal are applied to the input of the first register stage and the isochronous signal is obtained from the output of the second register stage. Shifting the information from the first register stage to the second register stage is controlled by a register which registers whether an information has been read from the second register stage and a new sample has been entered in the first stage. If these conditions have been satisfied, a shift pulse is applied to the shift register to shift the information from the first to the second register stage.

This shift register with associated control forms an elastic store by means of which differences in speed between the incoming telegraphy signal and the outgoing isochronous signal can be equalized by shortening or extending the stop elements of the telegraphy characters. In accordance with CCITT-recommendation R101 the isochronous rate is 2% higher than the nominal rate of the telegraphy signal and the difference in rate will be compensated for by extending the stop elements.

B SUMMARY OF THE INVENTION

Besides being able to convert telegraphy characters, the arrangement for converting the start-stop signals into an isochronous signal must also be able to process signaling signals which are not in the form of telegraphy characters. Such signaling signals can comprise pulses of a duration situated between given prescribed limits and of a given polarity. In the isochronous signal these pulses are represented by a number of bits of the corresponding polarity, this number being between prescribed limits.

CCITT recommendation R101 specifies the limits for the number of bits in the isochronous signal.

A low upper limit is indicated for the pulses having start polarity (A-pulses) in accordance with the CCITT type A signaling, which limit is difficult to achieve.

It is an object of the invention to provide a solution for this problem.

The arrangement according to the invention is characterized in that when, at the first sampling moment following after a given stop-start transition, the elastic store does not contain a sampling value which has not yet been read and, in addition, the next isochronous instant occurs within a given interval which is smaller than the spacing between two consecutive isochronous instants after the sampling moment, a new sampling value is prevented from being read at the said isochronous instant and is not enabled until at the next isochronous instant.

Due to this measure, the leading edge of the A-pulse is given a certain minimum delay which is equal to the duration of the said interval and which can be chosen so that the prescribed maximum number of bits in the isochronous signal is not exceeded.

In CCITT recommendation R101 the limits for the number of bits in the isochronous signal for the pulses having stop polarity (Z-pulses) are so wide, that at the upper limit, at a direct restitution of the pulse from the bits, a pulse prolongation to above the prescribed maximum duration can occur. With tandem connections of a number of transmission systems with alternating conversion of the telex signals into isochronous signals and of the isochronous signals, into telex signals this degradation of signaling pulses furnishes problems.

It is also an object of the invention to obviate the degradation of the Z-pulses.

To this end the arrangement according to the invention is further characterized in that in the signalling phase when, at the first sampling moment following after a given start-stop transition, the elastic store does not contain a sampling value which has not yet been read, a new sampling value is prevented from being read at the first subsequent isochronous instant and is not enabled until the next isochronous instant.

Due to this second measure, the leading edge (A-Z transition) of the Z-pulse is given a certain minimum delay, which can be chosen so that it is ensured that the maximum number of bits in the isochronous signal is one less than the maximum permissible number according to the CCITT recommandation R101. This enables the direct restitution of the pulse from the isochronous signal.

The Z-pulses are only produced in the so-called signaling phase, which starts in a two-way link when A-polarity is transmitted into the one or the other signal direction for a period of time exceeding 230 ms. The signaling phase ends at the occurrence of a Z-A transition in one signal direction, while constant Z-polarity is transmitted into the other signal direction. After the signaling phase, the so-called information phase starts, wherein information characters are transmitted.

The A-pulses are only produced in the information phase and will not be affected by the second measure if this measure is made dependent of the occurrence of the signaling phase.

C. SHORT DESCRIPTION OF THE FIGURES

FIG. 1 shows the block diagram of an arrangement according to the invention.

FIG. 2 shows some time diagrams.

D. REFERENCE

CCITT-recommendation R101.

E. DESCRIPTION OF THE EMBODIMENT (FIG. 1).

The telex signals I are applied to input terminal 1 and the isochronous signal is obtained from output terminal 2.

Clock pulses MC are applied to clock signal input 3 at a pulse repetition rate in Hz which exceeds the rate in Baud of the telex signal by 2%. A telegraphy rate of 50 Baud is assumed here.

Sampling pulses S, which are produced after predetermined signal, transitions in the telex signal are applied to scanning pulse input 4. These scanning pulses as well as other signals which are applied to the arrangement of FIG. 1 can be derived from conventional telegraphy signal regeneration devices.

FIG. 2a illustrates a telex signal I which may be produced at input terminal 1 and which, in this case, is formed by a pulse having A-polarity (A-pulse) having a duration of 161 ms.

In the CCITT type A signaling, A pulses are used as call-connect signal. The prescribed duration is 150 ms±11 ms folowed by Z-polarity for 2 seconds. In accordance with CCITT recommendation R101, 7-8 bits having A-polarity are compulsory in the isochronous signals. The A-pulse shown in FIG. 2a has the maximum duration of 161 ms. From a comparison of FIG. 2a with FIG. 2e, wherein the isochronous clock pulses MC are shown, it is apparent that, depending on the phase of the clock pulses with respect to the leading edge (Z-A transition), 8 or 9 clock pulses fall within the A-pulse.

The telex signal at input 1 is applied to shift register 5, which comprises the stages C0, C1 and C2. The sampling pulses at input 4 are also applied to shift register 5 and are used there as write pulses for writing a sampling value of the telex signal into a stage of the shift register.

The stage into which a sample of the telex signal is entered is determined by an allotting register 6, which produces an allotting signal at one of its outputs. The allotting signal is shifted one position to the left by a sampling pulse coming from input 4 and is shifted one position to the right by a clock pulse MC which passes AND-gate 7.

A clock pulse MC which passes AND-gate 7 also controls a bistable store 8 to take over the information from stage C0 of the shift register 5 and further controls shift register 5 to shift the information therein one position to the right.

The shift register 5 and the allotting register 6 form together an elastic store.

FIG. 2b shows the train of sampling pulses associated with the A-pulses of FIG. 2a. The first seven scanning pulses, numbered 1, . . . , 7 correspond to the normal scanning procedure of a telegraph character. The first pulse follows 10 ms after the Z-A transition and the next pulses at 20 ms internals thereafter. After the normal sampling procedure has ended, an additional scanning pulse is produced 150 ms after the Z-A transition. After the A-Z transition of the A-pulse a scanning pulse is produced 10 ms after the transition.

An AND-gate 9 forms the AND-function of three input signals:

1. Signal of stage A1 of allotting register 6;

2. Signal PN2, which is applied to an input 10 of the arrangement and indicates that a normal scanning procedure is being performed, and that the first scanning pulse has been produced as shown in FIG. 2c.

3. Signal DIV 1 . . . 8, which is applied to an input 11 of the arrangement and which indicates a predetermined 8 ms interval from the last scanning moment as illustrated in FIG. 2d.

When the AND-condition is satisfied, AND-gate 9 applies a signal to an inverted input of AND-gate 7, which is then cut-off. Should a clock pulse MC be produced in the time interval in which the AND-condition is satisfied then this pulse is not passed by AND-gate 7. Reading the elastic store 5–6 at an isochronous instant is then prevented.

Suppressing a clock pulse MC under the said conditions accomplishes the following.

Let the allotting signal be set in stage A0, indicating that the elastic store does not contain a sampling value which has not yet been read. Let then the first sampling pulse of FIG. 2b be produced. This pulse controls the writing operation of the first sampling value of the telex signal shown in FIG. 2a in stage C0, and shifts the allotting signal to stage A1.

Let now the next clock pulse MC be produced within 8 ms after the first scanning pulse. The AND-condition is satisfied at AND-gate 9 and the clock pulse MC is suppressed. This means that the sampling value (start element) entered into stage C0 cannot be read within 8 ms after writing-in thereof. The minimum delay of this sampling value when passing through the elastic store 5–6 will then be 8 ms. For this case the output signal of stage C0 is shown in FIG. 2f and FIG. 2g shows the polarity of the bits produced at the isochronous instants at output 2.

The additional 8 ms delay of the leading edge of an A-pulse relative to the trailing edge results in that the isochronous signal always contains 7 or 8 bits of A-polarity.

Z-pulses are present in the CCITT type B-signaling as busy signal/service signal. The prescribed duration is 165–260 ms, 8–14 bits of Z-polarity being present in the isochronous signal.

With the CCITT type C signaling, Z-pulses are used as call signals. The prescribed duration is 150–300 ms with 7–16 bits of Z-polarity in the isochronous signal. They are further used as reception confirmation signal. The prescribed duration is 405–495 ms with 20–26 bits of Z-polarity in the isochronous signal.

The upper limit of the number of bits having Z-polarity in the isochronous signal for these Z-pulses is such that the permissible maximum duration is exceeded on direct restitution of the pulses from the bits of the isochronous signal.

An AND-gate 12 forms the AND-function of three input signals:

1. Output signal of stage A0 of the allotting register 6;

2. Signal SP, which is applied to input 13 and indicates that the signaling phase is in progress; and 3. Signal PS1, which is applied to input 14 and indicates that an A-Z transition has occurred, which will start a sampling process for the Z-pulses.

When the AND-condition has been satisfied, AND-gate 12 applies a signal to the allotting register 6 which sets the allotting signal in stage A1.

Setting the allotting signal in stage A1 achieves the following.

Let the allotting signal be set in stage A0, indicating that the elastic store 5–6 contains no sampling value which has not get been read. Let further the signaling phase be in progress and let an A-Z transition occur.

The AND-condition is now fulfilled at AND-gage 12 and the allotting signal is set in stage A1. The first sampling value of the Z-pulse after the A-Z transition will now be stored in stage C1. This will introduce an additional delay of one cycle of the clock pulses MC, that is to say 19 7/12 ms.

The additional delay of the leading edge of the Z-pulse by approximately 20 ms relative to the trailing edge ensures that, for the said Z-pulses, the maximum number of bits of Z-polarity in the isochronous signal is one less than the maximum permissible number in accordance with CCITT recommedation R101. This enables the direct restitution of the Z-pulses from the bits of the isochronous signal without the maximum permissible duration being exceeded.

The trailing edge of the Z-pulse is processed in the same manner as the leadin edge of the Z-pulse. The Z-A transition occurring here constitutes the transition from the signaling phase to the information transmission phase, which prevents the AND-condition of AND-gate 12 from being performed at the trailing edge of the A-pulses.

What is claimed is

1. An arrangement for converting start-stop signals in a telex signal into an isochronous signal, comprising an elastic store in which sampling values, obtained by sampling the start-stop signal at sampling moments which have a given position with respect to given signal transitions, are stored and from which the sampling values are read consecutively at isochronous instants for forming the isochronous signal, wherein said arrangement further comprises a first means for preventing said reading of said elastic store for a period of at least one isochronous instant, whereby when, at the first sampling moment subsequent to a given stop-start transition, the elastic store does not contain a sampling value which has not yet been read and, furthermore, the next isochronous instant occurs within a predetermined interval which is less than the spacing between two consecutive isochronous instants after the sampling moment, a new sampling value is prevented from being read at the said isochronous instant and is not enabled until the next isochronous instant.

2. An arrangement as claimed in claim 1, wherein said arrangement further comprises a second means for preventing said reading of said elastic store for a period of at least one isochronous instant, whereby when the elastic store does not contain a sampling value which has not yet been read, at the first sampling moment after a given start-stop transition, a new sampling value is prevented from being read at the next isochronous instant and is not enabled until the subsequent isochronous instant.

* * * * *